US007582864B2

(12) United States Patent
Verentchikov

(10) Patent No.: US 7,582,864 B2
(45) Date of Patent: Sep. 1, 2009

(54) LINEAR ION TRAP WITH AN IMBALANCED RADIO FREQUENCY FIELD

(75) Inventor: Anatoli N. Verentchikov, St. Petersburg (RU)

(73) Assignee: Leco Corporation, St. Joseph, MI (US)

( * ) Notice: Subject to any disclaimer, the term of this patent is extended or adjusted under 35 U.S.C. 154(b) by 448 days.

(21) Appl. No.: 11/614,287

(22) Filed: Dec. 21, 2006

(65) Prior Publication Data

US 2007/0158545 A1 Jul. 12, 2007

Related U.S. Application Data

(60) Provisional application No. 60/753,032, filed on Dec. 22, 2005.

(51) Int. Cl.
*B01D 59/44* (2006.01)
*H01J 49/42* (2006.01)

(52) U.S. Cl. ....................... 250/290; 250/293; 250/281; 250/282

(58) Field of Classification Search ......... 250/281-283, 250/288, 290-294
See application file for complete search history.

(56) References Cited

U.S. PATENT DOCUMENTS 4,963,736 A 10/1990 Douglas et al.
5,179,278 A 1/1993 Douglas
5,420,425 A 5/1995 Bier et al.
5,576,540 A 11/1996 Jolliffe
5,847,386 A 12/1998 Thomson et al.
6,020,586 A 2/2000 Dresch et al.
6,093,929 A 7/2000 Javahery et al.
6,111,250 A 8/2000 Thomson et al.
6,121,607 A * 9/2000 Whitehouse et al. ........ 250/288
6,140,638 A 10/2000 Tanner et al.

(Continued)

FOREIGN PATENT DOCUMENTS

GB 2372877 A 4/2002

(Continued)

OTHER PUBLICATIONS

J. M. Campbell, et al., "A New Linear Ion Trap Time-of-Flight System with Tandem Mass Spectrometery Capabilities," Rapid Commun. Mass Spectrom. Dec. 1998, p. 1463-1474.

(Continued)

*Primary Examiner*—Bernard E Souw
(74) *Attorney, Agent, or Firm*—Price, Heneveld, Cooper, DeWitt & Litton, LLP

(57) ABSTRACT

An imbalanced radio frequency (RF) field creates a retarding barrier near the exit aperture of a multipole ion guide, in combination with the extracting DC field such that the barrier provides an m/z dependent cut of ion sampling. Contrary to the prior art, the mass dependent sampling provides a well-conditioned ion beam suitable for other mass spectrometric devices. The mass selective sampling is suggested for improving duty cycle of o-TOF MS, for injecting ions into a multi-reflecting TOF MS in a zoom mode, for parallel MS-MS analysis in a trap-TOF MS, as well as for moderate mass filtering in fragmentation cells and ion reactors. With the aid of resonant excitation, the mass selective ion sampling is suggested for mass analysis.

29 Claims, 7 Drawing Sheets

U.S. PATENT DOCUMENTS

| | | | | |
|---|---|---|---|---|
| 6,177,668 B1 * | 1/2001 | Hager | 250/282 |
| 6,194,717 B1 | 2/2001 | Hager | |
| 6,403,952 B2 * | 6/2002 | Whitehouse et al. | 250/288 |
| 6,452,168 B1 * | 9/2002 | McLuckey et al. | 250/292 |
| 6,504,148 B1 | 1/2003 | Hager | |
| 6,507,019 B2 | 1/2003 | Chernushevich et al. | |
| 6,770,871 B1 | 8/2004 | Wang et al. | |
| 7,189,967 B1 * | 3/2007 | Whitehouse et al. | 250/292 |
| 2001/0050335 A1 * | 12/2001 | Whitehouse et al. | 250/288 |
| 2004/0232327 A1 | 11/2004 | Bateman et al. | |
| 2007/0158545 A1 * | 7/2007 | Verentchikov | 250/282 |

FOREIGN PATENT DOCUMENTS

| | | |
|---|---|---|
| GB | 2388248 A | 5/2003 |
| GB | 2403590 A | 5/2005 |
| GB | 2403845 A | 12/2005 |
| WO | WO 91/03071 | 3/1991 |
| WO | WO 99/30350 | 6/1999 |
| WO | WO 01/15201 A2 | 3/2001 |
| WO | WO 2005/001878 A2 | 1/2005 |

OTHER PUBLICATIONS

Igor V. Chernushevich et al.,"Ch 6: Electrospray Ionization Time-of-Flight Mass Spectrometry," Electrospray Ionization Mass Spectrometry, John Wiley & Son, Inc. 1997, p. 203-233.

Igor V. Chernushevich, et al., "Ch 6: Electrospray Ionization time-of-Flight Mass Spectrometry," Electrospray Ionization Mass Spectrometry, 1997 John Wiley & Sons, Inc. p. 203-234.

Benjamin M. Chien, et al., "Plasma Source Atmospheric Pressure Ionization Detection of Liquid Injection Using an Ion Trap storage/Reflectron Time-of-Flight Mass Spectrometer," Anal. Chem. 1993, 65, p. 1916-1924.

Vladimir M. Doroshenko et al., "A Quadrupole Ion Trap/Time-of-Flight Mass Spectrometer with a Parabolic Reflectron," Journal of Mass Spectrometery, 1998, p. 305-318.

A. N. Verentchikov, M. I. Yavor, Yu. I. Hasin, and M. A. Gavrik, "Multireflection Planaor Time-of-Flight Mass Analyzer. II: The High-Resolution Mode," Technical Physics, Zhurnal Teknicheskoi Fiziki (2005), vol. 75 (No. 1), p. 84-88.

Boris N. Kozlov et al., "Linear Ion Trap with Axial Ejection as a Source for a TOF MS," ASMS 2005, p. 1-11.

John E. P. Syka, "Ch 4: Commercialization of the Quadrupole Ion Trap," Practical Aspects of Ion Trap Mass Spectrometry, CRC Press (1995), p. 169-205.

Scott A. McLuckey et al., "Ion Parking During Ion/Ion Reactions in Electrodynamic Ion Traps," Anal. Chem., 2002, 74, p. 336-346.

Scott M. McLuckey et al., "ASMS Archives," 2005 Abstracts, www.asms.org, 107 pages.

Steven M. Michael et al., "Detection of Electrospray Ionization Using a Quadrupole Ion Trap Storage/Reflectron Time-of-Flight Mass Spectrometer," Anal. Chem., 1993, 65, p. 2614-2620.

W. Paul et al., "Das elektrishe Massenfilter als Massenspektrometer und Isotopentrenner," Zeitschrift Fur Physik, Springer-Verlag (1958), p. 143-182.

J.D. Prestage et al., "New Ion Trap for Frequency Standard Applications," J. Appl. Phys., 66 (3), Aug. 1, 1989, p. 1013-1017.

E. Teloy et al., "Integral Cross Sections for Ion-Molecule Reactions. 1. The Guided Beam Technique," Chemical Physics 4, North-Holland Publishing Company (1974), p. 417-427.

Michisato Toyoda et al., "Multi-Turn Time-of-Flight Mass Spectrometers with Electrostatic Sectors," Nov. 3, 2003, J. Mass Spectrom. 2003, 38., Wiley InterScience, p. 1125-1142.

* cited by examiner

LINEAR ION TRAP WITH AN IMBALANCED RADIO FREQUENCY FIELD

CROSS-REFERENCE TO RELATED APPLICATIONS

This application claims the benefit of U.S. Provisional Application No. 60/753,032, filed on Dec. 22, 2005, the entire disclosure of which is incorporated herein by reference.

BACKGROUND OF INVENTION

The invention generally relates to the area of mass spectroscopic analysis and more particularly to linear ion traps as stand-alone mass spectrometers, as part of MS-MS tandems and as a source for time-of-flight mass spectrometers. More particularly, the invention is particularly concerned with providing mass selective ion sampling out of a linear ion trap in combination with soft conditioning of the output ion beam.

There are multiple examples in the prior art of linear ion trap mass spectrometers (IT MS), as stand-alone mass spectrometers, as a source for time-of-flight mass spectrometers (TOF MS) and as a part of tandem mass spectrometers (MS-MS). Linear ion traps and ion guides of various types are suggested to serve as ion accumulation devices, ion conditioning devices, pulsing devices and fragmentation cells for TOF MS, as well as devices for trapping ions after TOF MS for subsequent fragmentation, storing, conditioning and mass analysis. In the prior art, the trap devices are either ion trap mass spectrometers exhibiting a high mass resolving power, but poor ejected ion beam characteristics or they are devices exhibiting appropriate ion beam conditioning, but no mass selection features.

1. Ion Trap Mass Spectrometers

Ion trap mass spectrometers (IT MS) have been widely used since the 1990's. Most mature ITMS are based on Paul three-dimensional (3-D) quadrupole ion traps [W. Paul, H. P. Reinhard and U. von Zahn, J. Physik, V. 152 (1958) 143]. Such traps are composed of a ring electrode and two cap electrodes. A radio frequency (RF) signal is applied to the ring electrode while DC and weak AC signals are applied to the cap electrodes. The trap is filled with helium at about 1 mtorr gas pressure to dampen ion motion and to prevent excitation of unwanted resonance ion motions. Ions are generated within an external ion source, like an Electron Impact (EI), Electrospray, APCI or MALDI ion source and are injected into the trap, either continuously or in a pulsed manner.

Multiple strategies of ion manipulation have been developed [Syka, J. E. P. Commercialization of the Quadrupole Ion Trap. March, R. E.; Todd, J. F. J., Eds. Practical Aspects of Ion Trap Mass Spectrometry, V. 1: Fundamentals of Ion Trap Mass Spectrometry, 1. CRC Press: Boca Raton, Fla., 1995; 169-205]. Ramping of the RF signal amplitude allows resonance ejection with sequential ejection of ions. Depending on the frequency and amplitude of the AC signal, such ejection occurs either on the edge of ion stability or within the region of ion stability. Correlation of the ion signal with the RF amplitude provides mass spectrometric measurement of the entire contents of the ion trap. In other words, the trap is capable of parallel analysis of all ion species in a wide mass range. Slight distortion of the quadrupole field (introduction of an octupolar field component) is known to improve resolution of resonant ejection and to provide mass resolution in the order of R=10,000. Excitation of secular ion motion by an AC signal allows the rejection of unwanted ion species, and thus, an isolation of ions of interest within the trap. The isolated ions could be further excited by an AC signal to induce collisional fragmentation. A sequence of isolation, fragmentation and mass analysis by resonant ejection allows a multistage MS-MS analysis, which could be repeated multiple times to provide a so-called MS to the n ($MS^n$) analysis.

Paul 3-D ion trap mass spectrometers suffer multiple limitations, like low efficiency of ion injection (few percents), low space charge capacity (about 300 ions), high cut-off m/z at fragmentation (⅓ of upper mass), and slow and soft collisional fragmentation, which produces limited sequence information. Parameters of an ion trap have been substantially improved with the introduction of linear ion traps with radial ion ejection as disclosed in U.S. Pat. Nos. 5,420,425 and 5,576,540. The trap is made of three quadrupole segments. A radio frequency field is applied between rods in all three segments to confine ions in a radial direction. A repelling DC bias is applied to side segments to trap ions axially. Helium at 1 mtorr gas pressure is used to dampen ion motion. An AC signal is used to excite radial motion in one preferred direction, such that excited ions leave through slots in two opposite rods. Distortion of the rod geometry provides an octupolar component of the RF field to improve the resolution of resonance ejection. The strategies of MS and $MS^n$ analysis are similar to those implemented in 3-D traps. The space charge capacity of a linear trap is 10-30 fold better. The efficiency of axial ion injection is brought close to unity. Novel methods of ion excitation provide sequence information comparable to CID fragmentation in 3-Q and Q-TOF instruments (industry standard).

A linear ion trap with mass selective axial ejection (MSAE) assisted by resonance excitation has been suggested in U.S. Pat. Nos. 6,177,668 and 6,194,717. A linear quadrupole is surrounded by apertures with a repelling DC potential. The trap is held at $10^{-5}$ torr gas pressure. Ions are generated in an external ion source and are accumulated within the trap. A repelling DC potential at the exit aperture prevents the ions from leaving the trap. The ions of interest are excited by an AC signal which matches the frequency of ion secular motion. An ion cloud expands radially and in the vicinity of the exit aperture it reaches an instability zone (cone of instability) where radial and axial RF fields are coupled and the RF field is capable of ejecting ions over the weak (2V) repelling DC barrier. Thus, ions of interest are sampled out of the trap while leaving the rest of the ions within the trap. Scanning of trap parameters (RF amplitude, AC frequency, small DC field between rods) allows sequential ejection of various m/z components used for mass analysis. The trap allows efficient ion injection (close to unity), moderate efficiency of ion ejection (15-20%) and mass resolving power up to 5000. The trap is suggested to be coupled with a quadrupole or a TOF mass spectrometer for MS-MS analysis.

The above-described ion traps—three-dimensional Paul trap, linear ion trap with radial ejection and linear ion trap with MSAE—are all primarily designed for mass analysis with high resolving power and are based on a so-called resonance ejection. However, resonant ejected ions are unstable (because of high energy collisions in the trap during excitation and ejection) and possess large energy and angular spreads. This does not prohibit immediate detection of ions. However, this does affect coupling between ion traps and other mass spectrometric devices (such as a fragmentation cell, ion reaction cells, accumulating and transfer ion guides, ion mobility spectrometers, and other mass analyzers), ion soft deposition on surface, and ion gaseous accumulation for spectroscopic analysis or for gaseous ion reactions.

Besides mass analysis, there are multiple alternative applications of ion traps. For example, ion traps are used to store ions for the purpose of gaseous ion reactions [E. Teloy and D. Gerlich, Integral Cross Sections for Ion Molecular Reactions, The Guided Beam Technique, in Chemical Physics, v. 4 (1974) 417-427 and U.S. Pat. No. 6,140,638] and ion optical spectroscopy [J. D. Prestage, G. J. Dick and L. Maleki, New ion trap for frequency standard applications, J. Appli. Phys., v.66 (1989) 1017]. McLuckey et. al. employ 3-D and linear ion traps to reduce the charge of positive multiply-charged Electrospray ions [S. A. McLuckey, G. E. Reid, and J. M. Wells, Ion Parking during Ion/Ion Reactions in Electrodynamic Ion Traps, Anal. Chem. v. 74 (2002) 336-346]. Protein and large peptide multiply-charged ions are stored and exposed to a flux of negative reactant ions to reduce the charge, thus simplifying spectra interpretation. British Patent Nos. 2 372 877, 2 403 845 and 2 403 590 disclose multiply-charged ions stored in a trap to expose them to thermal electrons to produce an electron-capture dissociation (ECD) which provides rich sequence information.

There are multiple ion guide devices which do not have any mass separation features. Linear multipoles (usually quadrupoles) comprise a set of linear rods. Two opposite phases of radio frequency (RF) signals are applied to rods alternating between adjacent rods. As a result, the net RF field is zero on the axis of the guide and rises near rods. The inhomogeneous RF field retains ions in radial direction pushing them towards the center of an ion guide. Ion guides are gas filled at gas pressure P about 10 mtorr and have sufficient length L for ion collisional dampening (P*L>200 cm*mtorr) in the ion interface [U.S. Pat. No. 4,963,736] and in a fragmentation cell [U.S. Pat. No. 6,093,929]. Ion dampening is used for conditioning of the ion beam, i.e., for substantial improvement of ion beam characteristics. Ion guides with collisional dampening primarily serve for ion transport or ion accumulation. They are also employed as a fragmentation cell in tandem mass spectrometers. A weak axial field could be introduced within the ion guides [U.S. Pat. Nos. 5,847,386 and 6,111,250] to control axial velocity and time of ion refreshing. External electrodes (usually referred to as “auxiliary electrodes”) are used to impose an external field which partially penetrates between rods, thus modifying an axial potential distribution. A dragging axial field is used to accelerate ion transfer through a guide or fragmentation cell. An external field may be also used to provide local wells and weak traps.

Linear ion guides are readily convertible into linear ion traps by using any means to repel ions axially at entrance and exit ends. The most common method of ion trapping within ion guides employs a retarding DC potential at the exit apertures to plug ions on the ion guide ends [Prestage, same ref.]. Pulsing the potential on such apertures allows ion beam modulation and creates slow ion packets (microsecond scale) for injection into 3-D ion trap [U.S. Pat. No. 5,179,278] or TOF MS [U.S. Pat. No. 6,020,586]. Radiofrequency plugging has been used for trapping ions of both polarities [McLuckey ASMS 2005]. Such a trap is used, for example, to carry ion-ion reactions.

2. Time-of-Flight Mass Spectrometers Using Ion Traps

A variety of ion traps and ion guides have been used in combination with a TOF MS, and particularly with a TOF MS having an orthogonal ion injection (O-TOF MS) [PCT Patent Application No. WO 9103071 by Dodonov et. al.]. O-TOF MSs are widely used as stand-alone instruments and as a part of MS-MS tandems like Q-TOF and ITMS-TOF. O-TOF MSs provide a unique combination of high speed, sensitivity, resolving power (resolution) and mass accuracy. The method of orthogonal pulsed acceleration allows converting a continuous ion beam (like one generated in the intrinsically continuous ESI, APCI, EI and ICP ion sources) into frequent ion packets with a very short time spread (few ns), suitable for time-of-flight mass spectrometers. However, the efficiency of the conversion (so-called duty cycle) is limited. In singly-reflecting TOFs (so-called reflectrons) the duty cycle of an orthogonal accelerator is known to be in the order of K=10-30% for ions with highest m/z in the spectrum and dropping proportional to square root of m/z for smaller m/z ions.

Ion guides with collisional dampening in bath gas [U.S. Pat. Nos. 4,963,736 and 6,093,929] has been successfully applied to an o-TOF MS. The ion guide, usually a quadrupole guide at sufficient gas pressure P and length L (PL>200 cm*mtorr), improves spatial and energy characteristics of the continuous ion beam which helps improve the resolution and sensitivity of the o-TOF MS [Chernushevich I. V., Ens W., Standing K. G. In Electrospray Ionization Mass Spectrometry: Fundamentals, Instrumentation & Applications, Cole R (ed.). John Wiley & Sons: New York, 1997; Chapter 6, 203].

A scheme of storage and pulsed release of ions from an ion guide into an orthogonal acceleration stage is introduced by Dresch et. al. [U.S. Pat. No. 6,020,586] to improve the duty cycle. However, because of time-of-flight separation of ion packets in front of the orthogonal acceleration stage, the duty cycle is improved within a narrow mass range (depending on the time delay between ion release and pulsed acceleration) while it becomes zero for the rest of the ions. The method is useful when monitoring single secondary ion species in tandem mass spectrometers [U.S. Pat. No. 6,507,019], but provides marginal benefits in a single stage mass spectrometer. To recover a full spectrum one has to vary the delay in a series of pulses, thus losing an advantage of locally improved duty cycle.

U.S. Patent Publication No. 2004/0232327 discloses a method of ion bunching in front of an o-TOF MS. A time-dependent retarding or accelerating field is applied in the region between a pulsed ion source and the orthogonal accelerator. This method, however, inevitably leads to ions of different m/z gaining essentially different kinetic energies and thus leaving the orthogonal accelerator under essentially different angles. Such angular spread requires large-size detectors in conventional o-TOF MSs and it is unacceptable for multireflecting TOF MSs.

A number of schemes suggest an ion trap as a source for direct ion pulsing into a TOF MS. A 3-D trap is used for ion storage in Lubman S. M. Michael, B. M. Chien and D. M. Lubman, Anal. Chem. V. 65, (1993) 2614 and B. M. Chien, S. M. Michael and D. M. Lubman, Anal. Chem. v. 65 (1993) 1916 and a linear ion trap with radial ejection is suggested in Franzen. Recent studies of Kozlov et. al., [Linear Ion Trap with Axial Ejection As a Source for TOF MS, extended abstract, ASMS 2005, www.asms.org] have shown multiple problems of such schemes. Slow collisional dampening (at least 10 ms at 1 mtorr gas pressure) reduces a pulsing rate below 100 Hz (which is 100 times lower compared to a conventional o-TOF MS) and increases a spike load onto the TOF detector and data system. Because of a long cooling time, a substantial space charge is accumulated in the trap (1 to 10 million of ions), which deteriorates the ion cloud parameters and affects both mass resolution and mass accuracy of the TOF MS. Thus, ion trap pulsed sources are inferior to a conventional method of orthogonal acceleration out of a continuous ion beam.

The ion source schemes should be also reconsidered if applied to recently introduced multireflecting TOF MSs, which are very attractive for reasons of high resolving power above $10^5$ [Toyoda M., Okumura D., Ishihara M., Katakuse I., Multi-turn Time-of-flight Mass Spectrometers With Electrostatic Sectors, J. Mass Spectrom, 2003, V.38, p. 1125-1142], [Hasin et. al. JTP]. Co-pending PCT Patent Application No. WO 2005/001878 describes an MR-TOF with a planar geometry and with a set of periodic focusing lenses. The multireflecting scheme provides a substantial extension of a flight path (10-100 m) and thus improves resolution, while planar (substantially 2-D) geometry allows retention of a full mass range of analysis. Periodic lenses located in a field free space of the MR-TOF provide a stable confinement of ion motion along the main jig-saw trajectory.

Application of MR-TOF MS to intrinsically continuous ion sources is complicated by an even lower duty cycle of an orthogonal accelerator. A conventional orthogonal acceleration scheme is poorly applicable to an MR-TOF because of two reasons: a) longer flight times (1 ms) and lower repetition rates would reduce the duty cycle by 10 fold; and b) a smaller acceptance of analyzer to ion packet width in the drift direction would require a short length of ion packet (estimated to be below 5 mm for a 50 cm long MR-TOF) which would affect duty cycle again, compared to a conventional accelerator of 20 to 50 mm long. The overall expected duty cycle of MR-TOF with a conventional orthogonal accelerator is expected to be in the order of 1%.

Co-pending U.S. patent application Ser. No. 11/548,556, filed on Oct. 11, 2006, entitled "Multi-Reflecting Time-of-Flight Mass Spectrometer with Orthogonal Acceleration" by Verentchikov et al., the entire disclosure of which is incorporated herein by the reference, suggests several ways of improving duty cycle of an orthogonal accelerator in MR-TOF MS. The incoming ion beam and the accelerator are oriented substantially transverse to the ion path in the MR-TOF, while the initial velocity of the ion beam is compensated by tilting the accelerator and steering the beam for the same angle. To further improve duty cycle, the beam is time-compressed by modulating axial ion velocity with an ion guide. The residence time of ions in the accelerator is improved by either trapping the beam within an electrostatic trap or by slow ion introduction into a radial-confining ion guide that is electrostatic or radiofrequency driven.

3. Combination of ITMS with TOF-MS

A number of examples of tandem trap-TOF mass spectrometers are disclosed in the prior art. In Campbell J. M., Collins B. A. and Douglas D., A New Linear Ion Trap Time-of-Flight System with Tandem Mass Spectrometry Capabilities, Rapid Comm. Mass Spec., 12 (1998) 1463-1474 and in PCT Patent Application Nos. WO 9930350 and WO 0115201, a linear ITMS is coupled with a TOF MS. Ions of interest are isolated and then fragmented within the linear ion trap. A collection of all fragments is axially passed towards a TOF MS with an orthogonal ion injection, preferably in a pulsed manner. Doroshenko et. al. [A Quadrupole Ion Trap/Time-of-flight Mass Spectrometer with a Parabolic Reflectron, J. of Mass Spectrom., v. 33 (1998) 305] employs a 3-D ion trap for isolation and fragmentation of parent ions with subsequent ejection of all fragment ions into the TOF MS. In those examples, the trap is used as any other mass filter (like a quadrupole or magnet sector).

There are several examples of trap-TOF tandems wherein the performance is improved by using ion trap in a mode of mass selective ion ejection. In U.S. Pat. No. 6,504,148, the MSAE ion trap is used to sequentially eject ions in order of their m/z and to inject the ions into a fragmentation cell. The fragments are further analyzed by a time-of-flight mass spectrometer with an orthogonal acceleration. Because of a substantial difference in analysis time (trap scans in 100 ms scale and TOF MS—in 100 μs scale) the method allows so-called parallel MS-MS analysis, i.e., acquisition of fragment spectra for all parent ions.

U.S. Pat. No. 6,504,148 also suggests a direct coupling between an MSAE ion trap and a TOF MS with an orthogonal ion injection in order to improve the overall duty cycle of the TOF MS. Ions are released sequentially in the order of descending m/z. The delay of releasing small ions is compensated by their faster flight time such that ions of all m/z arrive to an orthogonal accelerator simultaneously and at the same ion energy. However, because of limited efficiency of ion ejection in the MSAE trap (<20%) and slow scanning (at least 10-20 ms), the method provides a marginal improvement of duty cycle, if any. Besides, energy and angular spread of ion beam out of the MSAE trap is substantially worse compared to a well-conditioned ion beam behind a collisional dampening ion guide.

Several subsequent attempts have been made using a 3-D ion trap for similar purposes. A mass dependent release from an ion trap into an o-TOF MS is suggested in British Patent No. 2 388 248. A three-dimensional ion trap is suggested as a preferred embodiment. Such a trap generates a substantial energy spread (at least tens of electron volts), high angular spread (a radian if using a 10 eV ion beam), and provides extremely slow scanning (typically longer than 100 ms per decade). Besides, the 3-D trap suffers low efficiency of ion injection into the trap (several percents) and small charge capacity. In a preferred embodiment of U.S. Pat. No. 6,770,871, a 3-D ion trap is coupled to a CID fragmentation cell and a TOF MS for the purpose of parallel MS-MS analysis.

Summarizing the above review, there are multiple applications and embodiments of linear multipoles and linear ion traps. The list comprises (but is not limited to):

- Mass spectrometers themselves, also serving as part of tandem mass spectrometers;
- Mass spectrometers with sequential ion ejection for parallel MS-MS analysis of fragment spectra for multiple precursors;
- Transfer ion guides as an interface in gaseous ion sources;
- CID fragmentation cells of tandem mass spectrometers, including accumulating function;
- Gaseous ion reaction cells for ion-ion and ion electron reactions and for optical spectroscopy;
- Ion guides for intermediate storage and ion accumulation for pulsed operating mass spectrometers, like traps or FTICR MS;
- Ion storage device as a source for preparing pulsed ion packets for TOF MS;
- Mass selective traps for sequential release of ions into orthogonal accelerator of TOF MS for improving duty cycle of the orthogonal accelerator; and
- Ion collecting devices for ion storing after separation in any mass spectrometer.

There are two distinct types of linear ion traps used so far:

- Linear ion guide devices with a good ion beam conditioning but without any mass selection.
- Ion traps mass spectrometers which employ resonance ion ejection to reach high mass resolving power. In such traps the ejected ion beam is unstable and has poor angular and energy characteristics, which affects coupling of ion traps to other mass spectrometric devices.

SUMMARY OF THE INVENTION

The inventor has realized that a linear ion guide could be converted into an ion trap by introducing a controlled imbalance of the RF signals. The imbalance creates an axial RF field near the terminating cap and thus creates a mass dependent exit barrier. Apparently, the trap allows a soft, rapid and mass selective ion ejection, though at moderate resolving power. The trap appears particularly useful in various tandem devices coupling an ion trap with a TOF MS, such as an orthogonal injection TOF MS with an improved duty cycle, a multi-reflecting TOF MS with a zoom mode of analysis and a parallel MS-MS which will be described below.

The imbalanced multipole RF field can be formed by unbalancing of either the amplitudes or phases of the RF signals. Such a field creates a hybrid trapping field: a two-dimensional field in the middle of the ion guide; and a three-dimensional ion trap field near the end caps of the ion guide. The latter field creates a mass dependent pseudo potential barrier at the axis of the ion guide while simultaneously providing radial ion confinement and conditioning of the outcome ion beam. By applying an extracting DC potential to one of the end caps, the pseudo potential barrier is compensated for ions above some threshold m/z. By varying an imbalance, one can scan the m/z threshold and obtain sequential sampling of the ions in a descending order of m/z. Contrary to alternative methods of a repelling DC barrier of an MSAE linear trap or an RF barrier with full RF amplitude of a 3-D trap, the suggested method provides a gentle barrier and very minor disturbance of the output ion beam.

According to a first aspect of the invention, an ion trap with mass-selective ion sampling is formed within an ion guide wherein the RF field is imbalanced. The ejection is preferably assisted by dampening gaseous collisions. Preferably, a weak DC gradient along the ion guide accelerates ion ejection and improves resolution of the ion sampling. In a particular case, a resonance excitation of ions within the ion guide is suggested to improve resolution of mass selective sampling, though at the cost of additional excitation of ejected ions.

Such a trap, for example, is usable as a low resolving mass spectrometer, where ions are pulsed introduced, then sequentially ejected by varying of RF imbalance and where the time course of the ion signal presents the mass spectrum of injected ions. The trap with the RF imbalance may also serve as an accumulating ion guide, or as a mass-selective fragmentation cell, or an ion gaseous reaction cell of tandem mass spectrometer. A moderate resolution of the trap is useful in retaining or loosing unwanted species. For example, the trap may release partially discharged protein ions or separate multiply-charged ions against a singly-charged chemical background. In all those applications, the trap of the invention provides a mass-selective ion sampling in combination with soft ion beam conditioning.

The invention is compatible with a variety of ion sources, particularly gaseous, such as ESI, APCI, APPI, ICP, DESI, CI, EI, MALDI—vacuum or gaseous. Collisional reaction or fragmentation cells of a tandem MS could also be considered as ion sources.

According to a second aspect of the invention, a mass-selective ion trap with an imbalanced RF field serves as an ion source for a time-of-flight mass spectrometer with an orthogonal ion injection (o-TOF MS) for the purpose of improving the duty cycle of the o-TOF MS. The speed of m/z scanning out of the ion trap could be adjusted to about 100 μs, comparable with the ion flight time from the trap to the orthogonal accelerator, such that ions in a wide m/z range arrive to the orthogonal accelerator simultaneously and with the same energy. It is desirable that the method is capable of fast scanning and provides a soft ion conditioning to form a cold and well-confined ion beam at the entrance of the orthogonal accelerator.

According to a third aspect of the invention, a mass-selective ion trap with an imbalanced RF field is used in combination with a multi-reflecting TOF MS, which operates in a mass zoom mode. The trap accumulates the entire ion beam of all m/z species and then ejects ions in multiple steps—where each step corresponds to a limited m/z range, matching the m/z range of the MR-TOF MS analysis. The m/z range may be varied to cover full m/z range within several steps, thus, improving the duty cycle and resolving power of the MR-TOF MS. Preferably, an additional storing and pulsing ion trap is installed between the mass selective ion trap and the MR-TOF to further improve sensitivity and resolution of the MR-TOF. Preferably, the MR-TOF MS comprises an orthogonal accelerator.

According to the fourth aspect of the invention, a mass-selective ion trap with an imbalanced RF field is sequentially coupled to a fragmentation cell and then to a TOF MS for the purpose of parallel MS-MS analysis, wherein separate fragment spectra are obtained for multiple parent ions during a single ejecting scan of the mass selective ion trap. Because of moderate resolution of the ion trap, such a tandem is preferably coupled with an up-front separation device, either chromatographic (LC, CE) or mass spectrometric.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
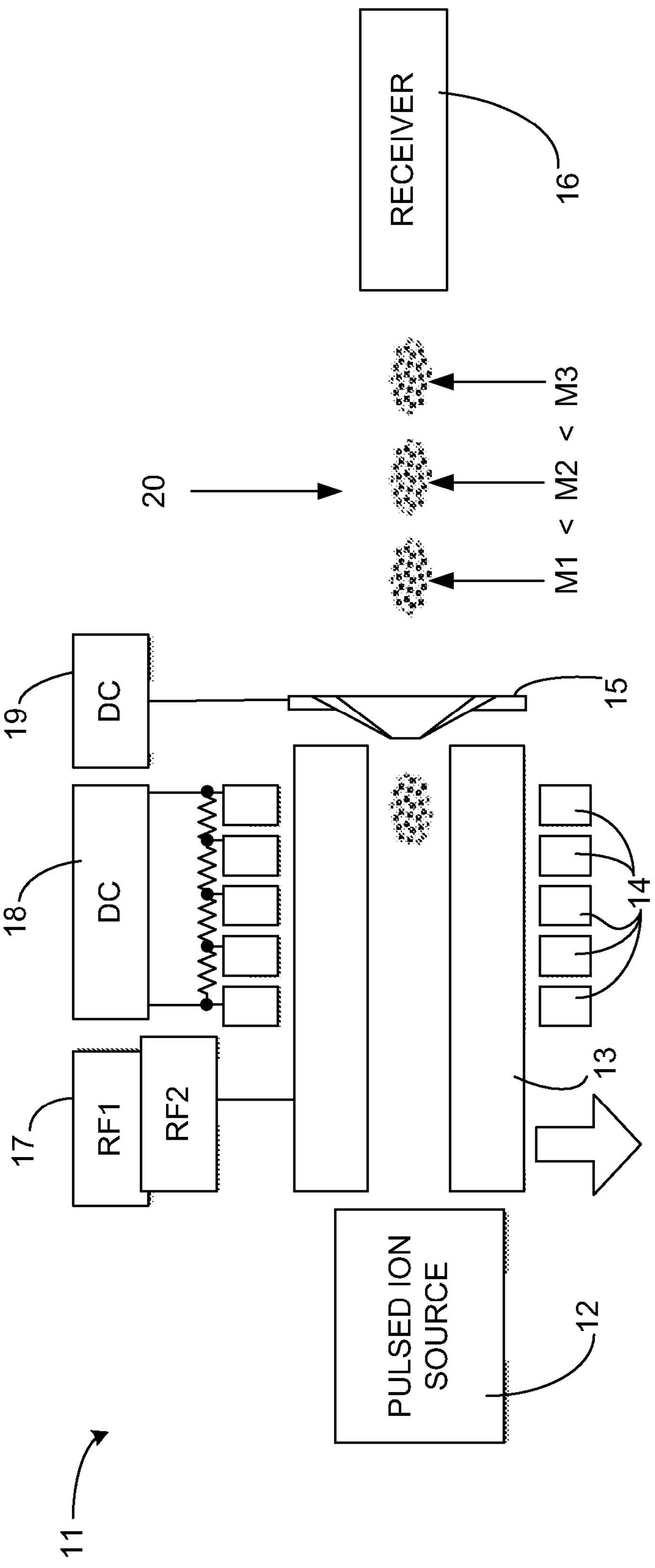
FIG. 1 is a schematic view of a mass-selective ion trap with an imbalanced RF field according to the present invention.

Referring to FIG. 1, a preferred embodiment of an ion trap with an imbalanced RF field comprises an ion source 12, a set of multipole rods 13 with a set of surrounding auxiliary electrodes 14, a conical exit aperture 15 and an ion receiver 16. The set of multipole electrodes 13 is connected to the poles of an RF signal generator 17. The optional auxiliary electrodes 14 are connected to DC supplies 18 via a chain of dividing resistors to distribute potential (preferably, linearly). The exit aperture 15 is connected to an extracting DC supply 19.

Figure 2:
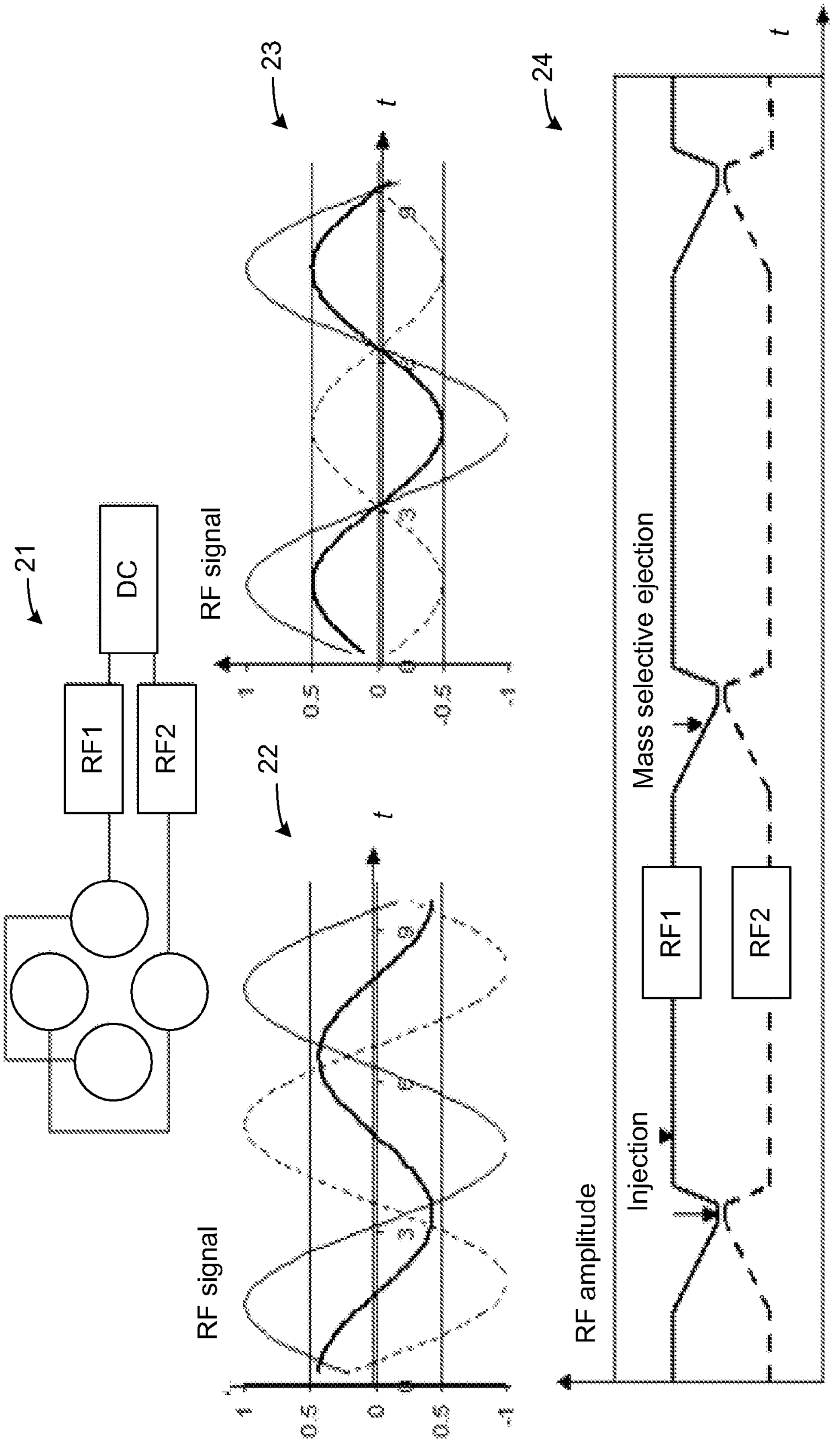
FIG. 2 includes timing diagrams of radio frequency imbalance.

Referring to FIG. 2 (scheme 21), each pole of the quadrupole set of electrode rods 13 is supplied with an RF signal of the same frequency. However, either the amplitude or the phase of both poles is controlled separately and imbalanced to create a non-zero potential on the quadrupole axis. Scheme 22 shows an example of two poles supplied with RF signals of the same amplitude, but with a phase shifted by less than 180 degrees. Scheme 23 shows an example wherein two poles are supplied with signals (shown by dashed line) of opposite phases (180 degree shift), but of different amplitude. In both cases the sum of two signals, presented by a solid thick line, is non zero.

The imbalanced multipole RF field, introduced by either amplitude or phase, creates a hybrid trapping field: a two-dimensional field in the middle of the ion guide; and a three-dimensional ion trap field near the end caps of the ion guide. The latter field creates a mass-dependent pseudo potential barrier at the axis of the ion guide while simultaneously providing radial ion confinement and conditioning of the outcome ion beam. By applying an extracting DC potential to the end cap, the RF pseudo potential barrier is compensated for ions above some threshold m/z. By varying an imbalance, for example, as shown in scheme 24 (same FIG. 2), one scans the m/z threshold and gets sequential sampling of ions in a descending order of m/z. Again, referring to FIG. 1, the train of ion packets 16 is shown at the exit of the mass selective trap. By using correlation of the time signal on receiver 20 with the course of RF imbalance (scheme 24), one can obtain information on m/z composition of the ions in the trap. Contrary to alternative methods of strong retarding barriers (DC barrier of an MSAE linear trap or an RF barrier with full RF amplitude of a 3-D trap), the suggested method provides a gentle barrier and very minor disturbance of the extracted ion beam.

An alternative method of creating an RF axial field near the exit of the multipole trap is based on applying an additional RF signal to auxiliary electrodes 14. The additional RF field penetrates between rods 13 and creates an axial RF field near the exit of the trap. The method is more cumbersome, but particularly attractive for creating a linear array of interconnected and identically RF imbalanced ion traps within a single set of multipole rods. Multiple step separation is expected to improve resolution of the separation.

Another alternative method of creating an imbalanced RF field near the exit of the ion guide is based on applying a separate RF signal to the exit aperture. The signal, for example, could be taken from any of the poles and then attenuated to control an imbalance. A separate frequency RF signal could be also applied to exit aperture 15. The method is less preferred since extracted ions are exposed to the RF signal at the time of passing through exit aperture 15. As a result, the ions gain an additional energy spread that is particularly large when the ion extraction time is comparable or smaller than a period of the RF signal.

Yet another alternative method of scanning the value of m/z threshold is based on varying an extracting DC field. Such scanning is easier to implement compared to variation of the RF imbalance and is preferred in several examples (e.g., the third embodiment described below).

However, this alternative method causes a larger energy and angular spread of the extracted ion beam and is recommended for use in combination with a downstream dampening device.

Mass-selective sampling and the parameters of the ion beams are preferably improved by dampening the ions in gaseous collisions at gas pressure around 1-10 mtorr. Preferably, a weak DC gradient formed by auxiliary electrodes accelerates the ion ejection and improves the resolution of ion sampling. A radial resonance excitation of ions within the ion guide is expected to improve resolution of mass-selective sampling, though at the cost of additional excitation of ejected ions. Then, the ion trap can be considered for use as a mass spectrometer with a moderate resolving power.

A mass-selective trap with an imbalanced RF field may also serve as an accumulating ion guide or a pulsed ion source for a mass spectrometer and also as a mass-selective fragmentation cell of a tandem mass spectrometer or an ion gaseous reaction cell. In all those applications, the trap of the invention provides mass-selective ion sampling (though at moderate resolution) in combination with appropriate ion beam characteristics.

To demonstrate the utility of the mass-selective ion reaction cell, consider an example of an ion trap for colliding multiply-charged ions with ions of opposite polarity. Such reactions lead to partial discharging at different reaction rates depending on ion concentration, energy and nature. Multiply-charged ions lose charge and their m/z value increases. The mass-selective trap can be used to retain reactant ions below a threshold m/z, while releasing product partially discharged ions. The degree of discharging is controlled by setting the m/z threshold. A more elaborate strategy could be employed to mass select precursors and products while monitoring results of multiple iterations. Another useful example is applying the threshold in a fragmentation cell of a Q-TOF MS to cut off fragments with an m/z below one for parent ions and thus to isolate multiply-charged precursors from a singly-charged chemical background.

According to the second embodiment of the invention, the linear ion trap with an imbalanced RF field serves as a mass-selective ion source for a TOF MS with an orthogonal ion injection in order to improve the duty cycle of the TOF MS.

Figure 3:
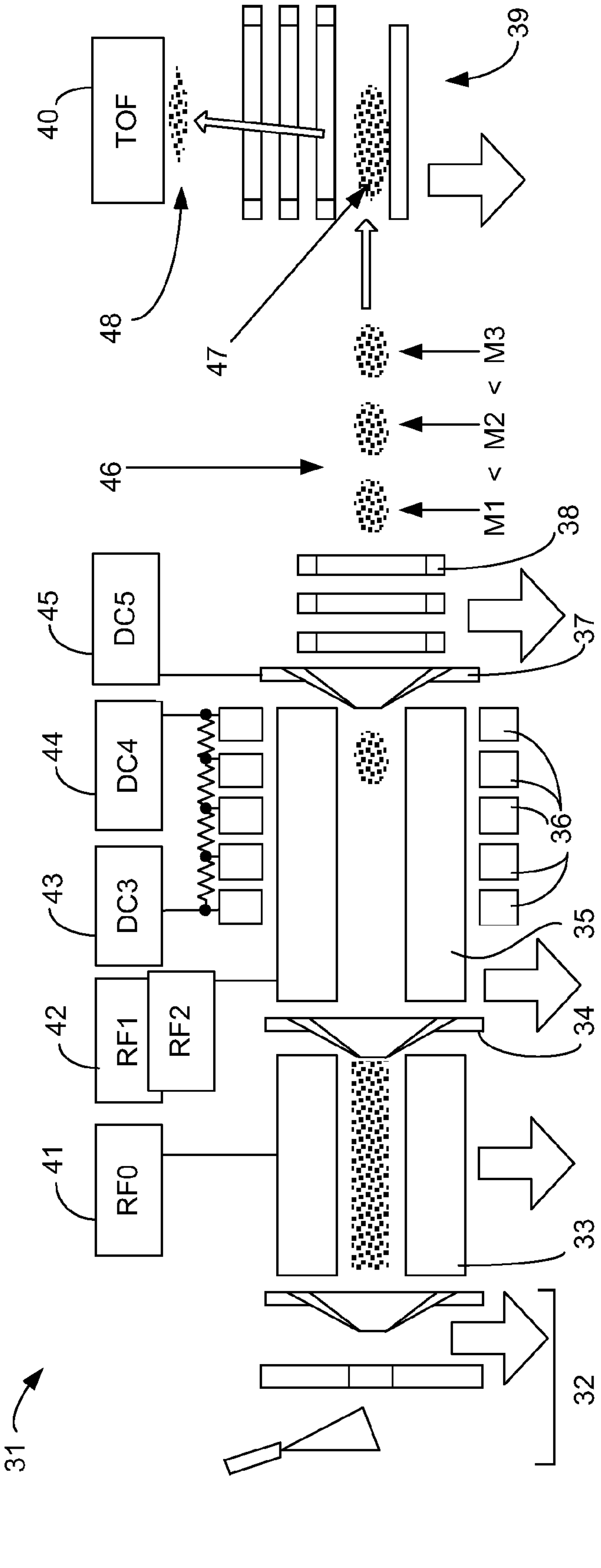
FIG. 3 is a schematic view of the preferred embodiment of a mass-selective ion trap with an imbalanced RF field for a TOF MS with an improved orthogonal ion injection according to the present invention.

Referring to FIG. 3, the second embodiment 31 of the linear ion trap with an imbalanced RF field for a TOF MS with an improved orthogonal ion injection comprises the sequentially interconnected elements—an Electrospray ESI ion source 32 (as an example); an intermediate ion guide 33; a mass-selective ion guide 35 surrounded by a set of auxiliary electrodes 36 and by apertures 34 and 37 with an exit aperture 37 preferably having a cone shape; a set of ion lenses 38; and an orthogonal accelerator 39 in front of a TOF MS 40.

The elements of the TOF MS 31 are differentially pumped (shown by arrows). FIG. 3 shows only the relevant voltage supplies. The intermediate ion guide 33 is connected to a radio frequency supply 41 (RFO) with symmetric RF phases and a built-in DC bias. The mass-selective ion guide 35 is connected to a radio frequency supply 42, having at least two separately controlled RF phases—RF1 and RF2. Both phases have the same built-in DC bias (DC2). The set of auxiliary electrodes 36 is connected to supplies 43 (DC3) and 44 (DC4) via a chain of dividing resistors. The potential of auxiliary electrodes 36 sags between electrodes of the mass-selective ion guide 35 and provides a gentle axial electrostatic field driving the ions towards the exit. The exit aperture 37 is connected to DC supply 43 (DC5), which is preferably about 1V lower compared to DC2 and DC4 in order to provide a weak extracting DC field.

Figure 4:
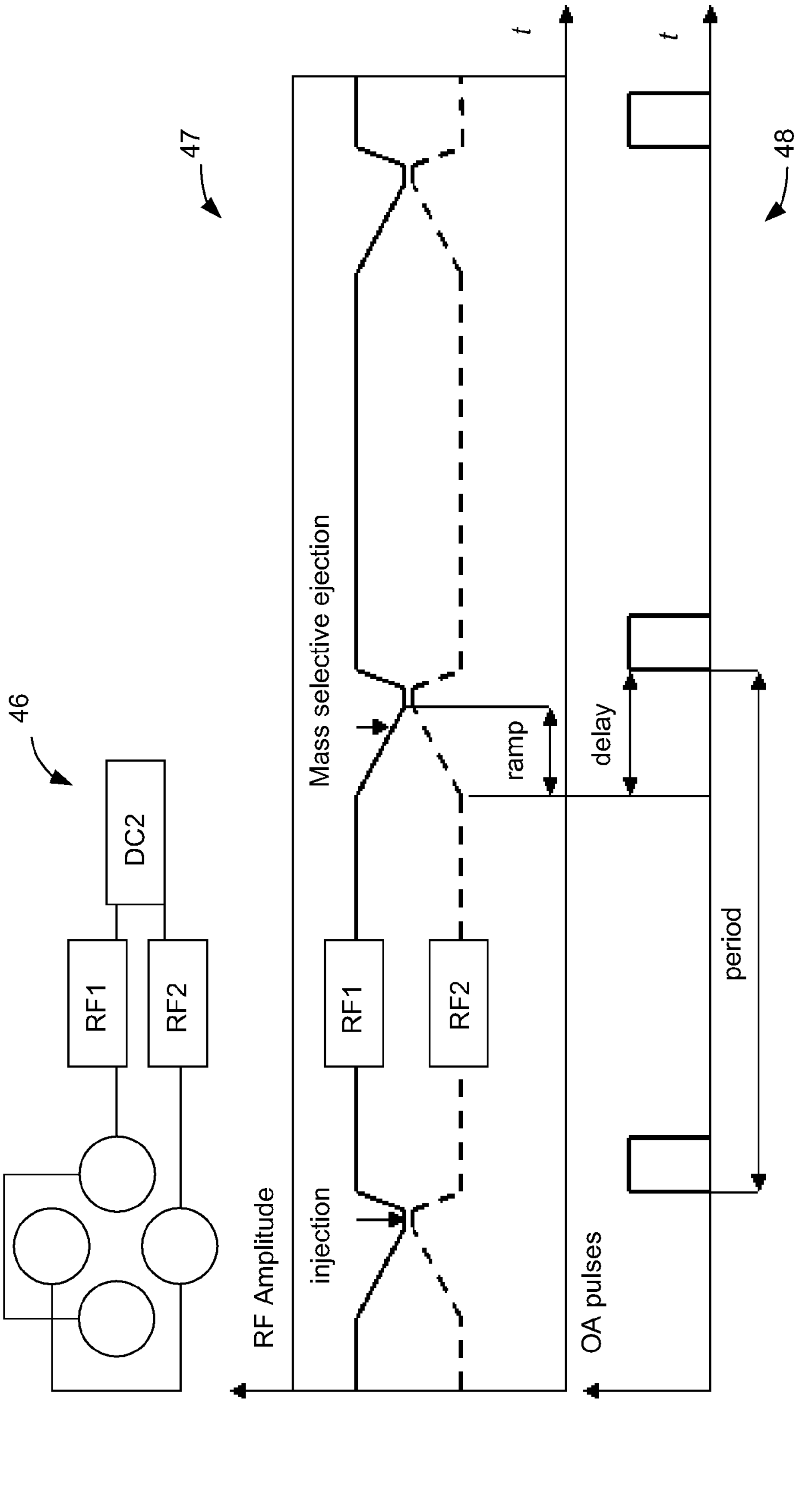
FIG. 4 includes timing diagrams of radio frequency imbalance and of orthogonal pulsing.

Referring to FIG. 4, the schematic 46 shows two separately controlled phases of an RF signal which are applied to two sets of poles of the ion guide, here shown as a quadrupole. The imbalance of RF phases is varied in time as shown in time diagram 47. For simplicity, consider the separate control of the RF amplitudes. Normally, two phases are imbalanced. Periodically they are brought in to balance at a ramping time about 100 μs. Pulses of the orthogonal accelerator are synchronized and delayed to variation of balance as shown in time diagram 48.

In operation, the ion source generates a continuous ion beam which is transmitted into the optional intermediate ion guide 33. Typically, gas pressure in the intermediate ion guide is held in-between 10 to 300 mtorr to maximize gas and ion flux into the guide, though being limited by pumping means. The ion beam is further introduced into the mass-selective ion guide 35, which is preferably held at a lower gas pressure around 5-10 mtorr, just sufficient to trap and to dampen ions in-between ejection pulses. A lower gas pressure is beneficial to reduce gas scattering at ion extraction and to reduce gas load onto the pumps of the mass analyzer. To improve sensitivity, the ions are preferably pulse-transferred in-between ion guides, for example, by modulating the potential of the intermediate aperture 34. Preferably, the ions are pulse-injected at the moment when two phases of the RF signal are balanced. Apparently an RF imbalance has a much smaller effect at the entrance seeing an internal surface of cone 34. Besides, the ions are more energetic at the entrance and the RF imbalance does not prevent ions from entering.

After ions are introduced into the second ion guide 35, the two phases of RF field are then brought to imbalance. The most preferred method of imbalance is to drive the amplitude of one phase up while bringing down the second one, as shown in FIG. 4. This way the net confining RF signal—

$V_{RF}=(V_{RF1}+V_{RF2})/2$—stays constant, while the potential of the axis gains an RF component:

$V_{AXIS}=(V_{RF1}-V_{RF2})$

With the appearance of the net RF potential of the axis there simultaneously appears a minor radial octupolar RF field (due to the effect of auxiliary electrodes) and a 3-D RF field near apertures 34 and 37. The 3-D field near the exit aperture creates a mass dependent barrier, mostly repelling light ions. The height of the barrier is proportional to the square of the RF imbalance. In the presence of a weak extracting DC field, the barrier becomes transparent for ions with an m/z above some threshold value. It is extremely important that the height of the RF barrier for released ions can be minimized to a Volt or a fraction of a Volt, which is controlled by the extracting DC gradient. SIMION simulations of ions support the view that such a low barrier still allows sufficient mass selectivity and ion radial confinement within the guide. A weak barrier is the key for conditioning of ion beam behind the ion guide and in front of the TOF MS.

Ions are slowly driven towards the ion guide exit by a weak gradient of the axial field (generated by auxiliary electrodes). However, the RF barrier prevents them from leaving. By reducing the imbalance of RF phases, the barrier is lowered and the ions are progressively released in the order of descending m/z. As is suggested by SIMION, the simulations are performed in the presence of a weak axial field (about 0.1 V/cm). The ramping time of imbalance can be adjusted down to 50 μs while completely emptying the ion guide within a single cycle and sustaining mass separation of the ion sampling. The ramping speed of 50 to 100 μs is comparable to the flight time for heavy ions (typically) between the ion guide and the orthogonal accelerator. Now it becomes possible to compensate the difference in flight times by a mass-selective delay of ion ejection, thus arranging simultaneous arrival of ions with various m/z into the orthogonal accelerator and in this way improving the duty cycle of the orthogonal injection (i.e., the efficiency of conversion of continuous ion flux from the ion source into ion pulses).

Contrary to the prior art, the invention allows time compression of a wide mass range simultaneously with the proper conditioning of the ion beam—i.e., sustaining low angular and energy spread of the ions. It is desirable, in particular for multi-reflecting TOF MS, that ions of different m/z arrive to the orthogonal accelerator with essentially the same energy.

Multiple variations of the preferred embodiment could be made. The invention is applicable to alternative ion sources including APCI, APPI, ICP, MALDI at vacuum, intermediate and atmospheric gas pressures, CI, EI, SIMS, FAB, etc. A fragmentation cell or an ion molecular cell of a tandem mass spectrometer may be considered as an ion source. The mass-selective ion guide of the invention can serve as a fragmentation or ion molecular reaction cell itself.

Other variations include pulsed or continuous introduction of ions into the mass-selective ion guide. A higher order multipole (compared to a quadrupole) is expected to increase the space charge capacity of the ion guide. The overall duty cycle could be optimized by adjusting the time dependence of the imbalance variation. Multiple usable accelerator schemes comprise grid-free accelerators, accelerators with an increased length and ion packet steering in the third direction—orthogonal to both the TOF axis and the axis of the continuous ion beam. Various TOF mass spectrometers are usable, including a multi-reflecting, a multi-turn or a singly-reflecting TOF MS.

According to the third embodiment of the invention, the mass-selective sampling is used to support a ‘zoom’ mode of a multi-turn TOF MS analysis. The MR-TOF MS is known to allow a trade-off between resolution and mass range. By closing ion trajectories into loops, the flight path is raised, but only a narrow mass range could be analyzed without overlapping and confusion of different m/z species. It is beneficial to hold the entire content of the initial ion beam in the linear ion guide and to sample a mass range of analysis into the MR-TOF MS. The whole mass range could be covered with zoom segments, this way improving resolution of the MR-TOF MS without losing ions.

Figure 5:
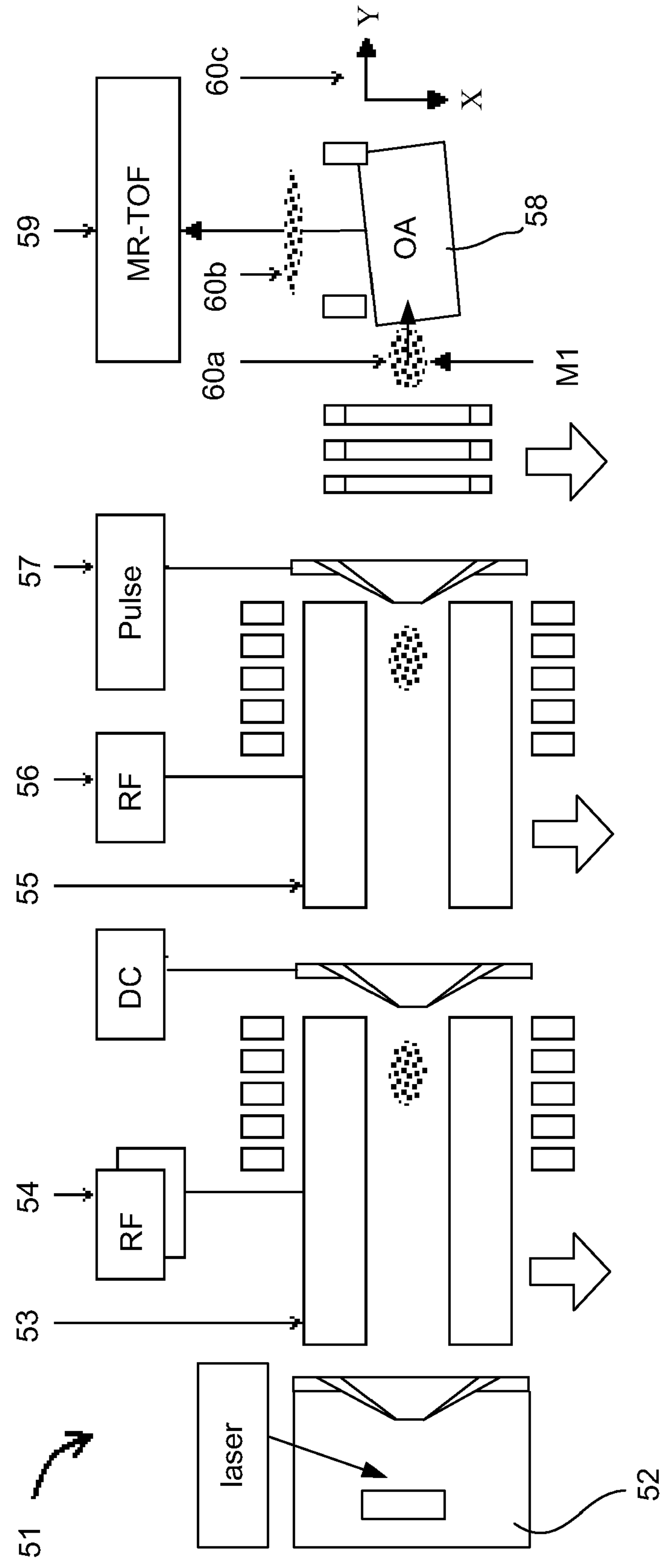
FIG. 5 is a schematic view of the preferred embodiment of a mass-selective ion trap with an imbalanced RF field as an ion source for a multi-reflecting TOF MS according to the present invention.

Referring to FIG. 5, the third embodiment (51) of a linear ion trap with an imbalanced RF field for a multi-reflecting time-of-flight mass spectrometer (MR-TOF MS) comprises an ion source 52; a mass-selective ion trap with rods 53, which are supplied with individually controlled poles 54 of RF signal; a second ion guide with rods 55, which are supplied with a balanced signal from RF generator 57; an second exit aperture with a pulsed supply 57; an orthogonal accelerator 58 and a multi-reflecting mass spectrometer 59.

In operation, a pulsed ion source 52 (here shown as a MALDI ion source at an intermediate gas pressure) generates multiple m/z species of ions, corresponding to multiple analyzed species in the sample. Preferably, ions are produced by multiple laser shots and are accumulated within the mass-selective ion trap 53. When the alternative continuous ion source is used, an additional ion guide is used to accumulate ions and to form periodic pulses. Alternatively, the auxiliary electrodes of the mass-selective ion trap are used to form an intermediate DC well as a storing segment within the ion trap 53. Once the whole set of mass species is accumulated within the mass-selective ion trap, the imbalance of the RF supply 54 stays the same, but the extracting DC field is varied in increments to sample ions within a controlled m/z range into the subsequent—second linear ion trap 36. After collisional dampening, the ions get stored near the exit of the second trap. To form the trap, a repelling potential is employed on the second exit aperture and a weak DC gradient is applied to the auxiliary electrodes. Periodically, the entire content (comprising the m/z range sampled out of the first ion guide) is pulse-ejected out of the second ion trap. The packet of ions 60*a* is rapidly delivered by ion optics and enters the orthogonal accelerator 58. Pulses of the accelerator 58 are synchronized with the ejection pulse of the supply 57, to maximize conversion of the current packet 60*a* with a narrow m/z range into the orthogonal ion packet 60*b*. Note, that the delay between the pulses should be varied accounting for the selected m/z range (e.g., using a square root dependence). Subsequently, the next increment of m/z (in descending m/z order) is sampled into the intermediate ion guide, then pulse-ejected out of the second ion guide and is efficiently converted into orthogonal ion packet. Eventually the entire content of the mass-selective ion guide becomes converted into ion packets at high efficiency of conversion, approaching unity.

Though, the procedure seems exceedingly cumbersome, the sequential sampling of narrow m/z ranges improves the overall duty cycle of the orthogonal accelerator and also achieves an additional improvement which is specific for multi-reflecting time-of-flight mass spectrometers (MR-TOF MS)—namely, raising flight path and resolution of the TOF analysis, which will be illustrated below. The below described MR-TOF MS is the one described in co-pending PCT Application No. WO 2005/001878, the entire disclosure of which is incorporated herein by reference.

Figure 6:
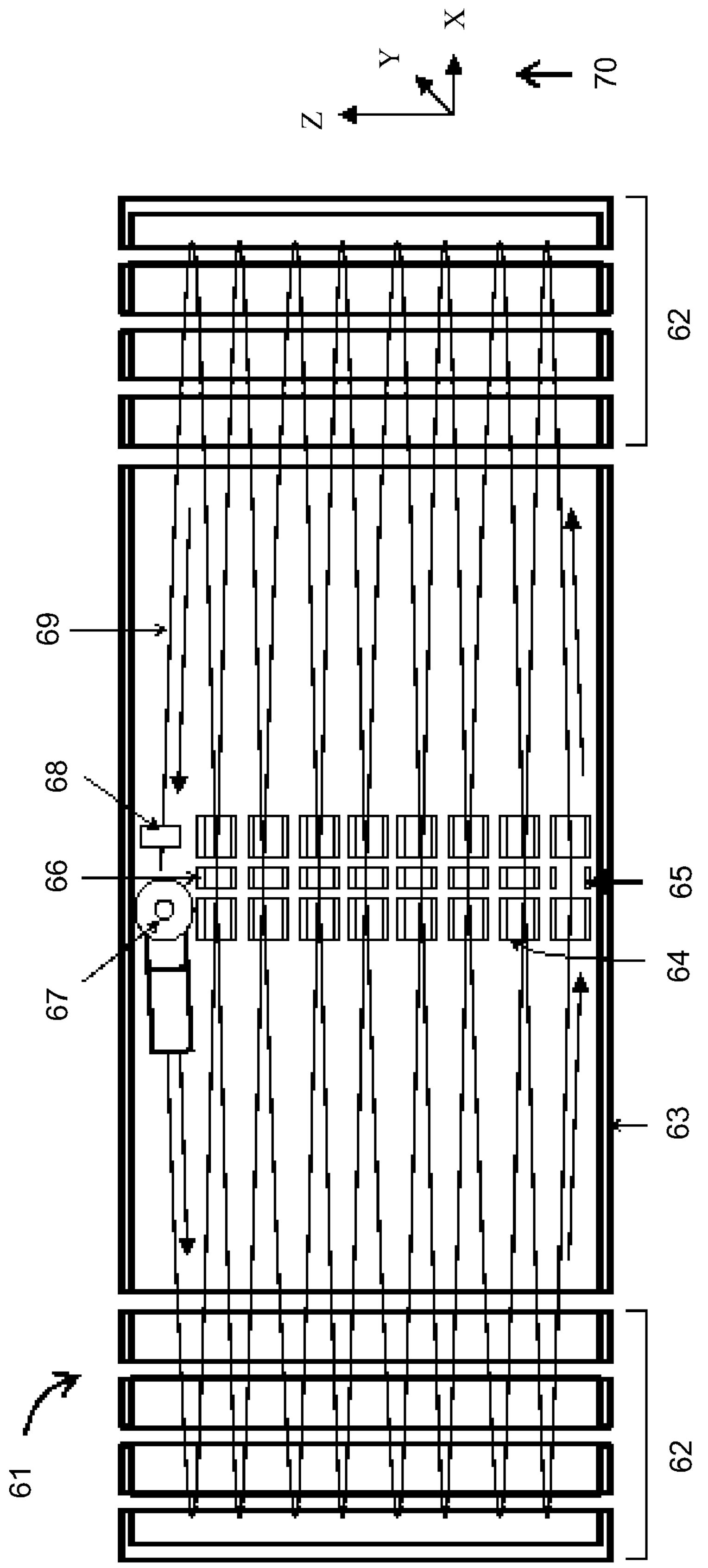
FIG. 6 is a schematic view of an example of a multireflecting TOF MS for mass analysis in a mass zoom mode according to the present invention.

Referring to FIG. 6, an example of the MR-TOF MS 61 comprises a pair of grid-free ion mirrors 62, a free flight region 63, a set of periodic lenses 64 with edge deflectors 65 and 66, an orthogonal ion source 67 and an ion detector 68. The mirrors 62 are substantially extended along the Z-axis (of axes denoted as "70"), except the boundary areas of the mirrors form a substantially 2-dimensional X-Y electrostatic field. The orthogonal accelerator is aligned such that ion packets are accelerated substantially along, and at a slight angle to, the X-axis which induces multiple ion reflections in the X-direction and a slow drift in the Z-direction, thus forming a jig-saw ion path. Periodic lenses enforce a fixed period of ion drift. The edge deflector 65 provides a static reversal of the drift motion in the Z-direction thus doubling the flight path.

Ions follow a multi-reflecting trajectory 69 and finally reach the detector 68. As described in PCT Application No. WO 2005/001878, a pulsed deflector 66 can be used to close the ion trajectory into loops and to keep ions trapped in the electrostatic analyzer for a pre-selected time. As a result, the trajectory path increases, which improves the mass resolving power of the TOF MS but at the cost of reduced mass range. Ions of various m/z overlap at various number of turns. If ions of all m/z species would be admitted, then spectra would be confused. However, the above-described mass-selective sampling allows improving the TOF MS resolving power without confusion and peaks overlapping.

Referring to FIG. 5 and FIG. 6, the preferred alignment of orthogonal accelerator is compatible with that which is disclosed in co-pending U.S. Provisional Patent Application No. 60/725,560, filed on Oct. 11, 2005, by Anatoli N. Verentchikov et al. and entitled "Multi-Reflecting Time-of-Flight Mass Spectrometer with Orthogonal Acceleration," the entire disclosure of which is incorporated herein by reference. Note that the axes notation is preserved between the figures. In FIG. 5 the slow ion packet 60*a* ejected from the ion guide 55 propagates along the Y-axis and is then accelerated along the X-axis. In FIG. 6 the incoming ion beam (shown as a circle in accelerator 67) propagates along the Y-axis and is then accelerated substantially along the X-axis. As described in co-pending U.S. Provisional Patent Application No. 60/725,560, the accelerator 58 is tilted to the X-axis and ion beam is steered to mutually compensate the time distortions of tilting and steering.

The afore-described method could be modified in multiple ways to optimize speed and sensitivity as described in co-pending U.S. Provisional Patent Application No. 60/725,560. To accelerate ion dampening, the velocity of ions in the second ion guide could be pulse modulated. To improve the duty cycle, the orthogonal accelerator may comprise an electrostatic trap.

According to the fourth embodiment of the invention, the mass-selective ion trap with RF imbalance is used for mass separation in tandem mass spectrometers with a so-called parallel MS-MS analysis, i.e., acquisition of multiple non-redundant fragment spectra of different parent ions during a single mass-selective scan of the ion trap with mass-selective ion sampling (i.e., without rejecting parent ions).

A mixture of primary ions becomes separated in the mass-selective ion trap and fragment spectra are acquired for all parent ions without discarding any of the parent or fragment ions in mass-dependent scans. The resolution of mass-selective sampling could be improved by resonance excitation of the radial secular motion. Highly selective radial excitation couples to axial energy and helps ions to pass above the exit RF barrier. Though mass resolving power of the mass-selective ion trap with RF imbalance is moderate, the capability of rapid and parallel MS-MS analysis in the ion trap-TOF may become valuable for analysis of simple mixtures or in combination with other complementary separation methods, such as CE, LC or mass separation.

Figure 7:
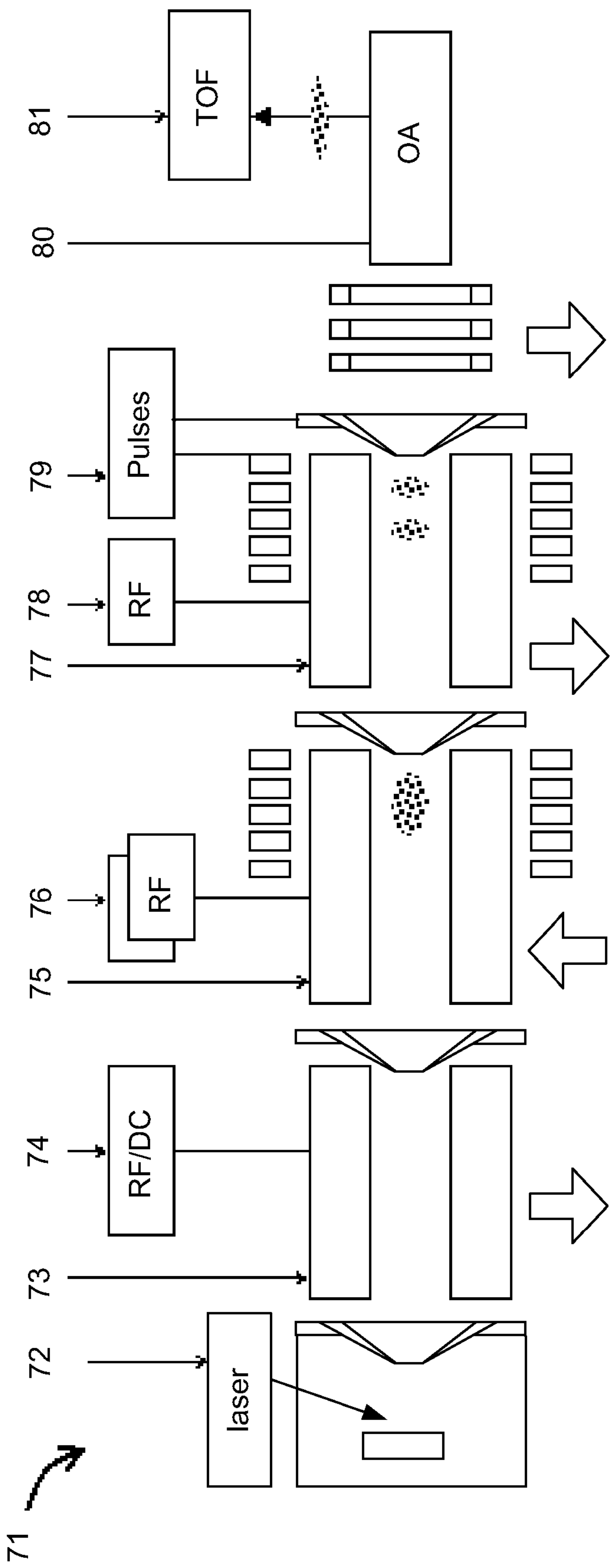
FIG. 7 is a schematic view of the preferred embodiment of the mass-selective ion trap with an imbalanced RF field as a mass separator for a parallel MS-MS analysis according to the present invention.

Referring to FIG. 7, an example of the $MS^n$ system is given, wherein separation of parent ions in an analytical quadrupole mass spectrometer 73 is coupled with mass sampling of daughter ions in the mass-selective ion trap 75 and mass analysis of granddaughter ions in an O-TOF MS 81. The example system comprises an ion source 72, here again a MALDI ion source, an analytical quadrupole 73 with an analytical RF-DC signals source 74, a mass-selective ion trap 65 with an imbalanced RF generator 76 having separately controlled and partially imbalanced RF poles, also serving as an accumulating fragmentation cell for parent ions, a second ion trap 77 with a balanced RF supply 78, which serves as a fragmentation cell for daughter ions, a pulsed voltage source 79 for time modulation of the exit granddaughter fragment ions and a time-of-flight mass spectrometer 81 with an orthogonal ion injection 80 for mass analysis of granddaughter ions.

In operation, ions of various species are formed in the source 72, either continuous or pulsed. The analytical quadrupole 73 is used to separate a narrow m/z range of parent ions, which are then accelerated towards mass-selective ion guide 75, such that the ion energy becomes sufficient for fragmentation. The initial imbalance of RF phases is chosen to be sufficient to trap both fragment and parent ions, i.e., the ion guide serves as an accumulating fragmentation cell. Periodically, the incoming ion flux is stopped and ions are sequentially released from the mass-selective ion guide. The ejected ions are again accelerated to a sufficient energy to fragment within the second ion guide 77, which serves as a fragmentation cell for daughter ions. Ions are then periodically ejected into the orthogonal accelerator 80 and the TOF MS for mass analysis of granddaughter ions. Velocity of daughter ions is modulated within the second ion guide 77 using pulsed supplies 79, applied either to auxiliary or exit electrodes. A modulation is used synchronously with subsequent orthogonal accelerating pulses to improve the duty cycle of the orthogonal accelerator 80. In spite of the low resolving power for daughter ions within the mass-selective ion guide, the described analysis method provides a rapid and sensitive $MS^3$ analysis. Separation and fragmentation of daughter ions occurs in parallel (within the single injection cycle) and without discarding ions in mass scans.

Obviously, a number of other schemes could be synthesized wherein a mass-selective sampling ion trap could be used at either stage of hybrid spectrometers or tandems with various methods of liquid separation or applied to various ion sources.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A method of mass dependent ion sampling, comprising steps of:

introducing ions into a substantially two-dimensional multipole radio frequency (RF) field;

providing an extracting DC field at an exit of the multipole RF field; and creating a non-zero axial RF field at the exit of the multipole RF field.

2. The method of claim 1, further comprising a step of adjusting the non-zero axial RF field.

3. The method of claim 1, further comprising a step of adjusting the extracting DC field.

4. The method of claim 1, further comprising gas collisional dampening of ions in the multipole RF field.

5. The method of claim 1, further comprising a step of creating an axial DC field inside the multipole RF field.

6. The method of claim 1, further comprising excitation of radial ion secular motion inside the multipole RF field.

7. The method of claim 1, wherein the non-zero axial RF field is created by an imbalance of amplitudes of two phases of RF potentials that create the multipole RF field.

8. The method of claim 1, wherein the non-zero axial RF field is created by adjusting a phase difference of two phases of RF potentials that create the multipole RF field.

9. The method of claim 1, wherein the non-zero axial RF field is formed by penetration of a fringing field created by auxiliary electrodes between multipole electrodes.

10. The method of claim 1, wherein the step of introducing ions includes introducing pulsed ions.

11. A method of mass spectrometric analysis using the method of mass dependent ion sampling of claim 1.

12. A method of tandem mass spectrometric analysis comprising the step of parent mass separation, wherein the step of parent mass separation is performed using the method of mass dependent ion sampling of claim 1.

13. A method of orthogonal ion introduction into a time-of-flight mass spectrometer wherein ions are sequentially released from a radio frequency ion guide by the method of mass dependent ion sampling of claim 1.

14. A method of arranging gaseous ionic reactions in a cell comprising ion sampling by the method of claim 1.

15. The method of claim 14, wherein the gaseous ionic reactions are arranged between particles of opposite polarity.

16. The method of claim 15, wherein a mass selective threshold of the cell is adjusted to retain reactant ions and to release product ions with a higher m/z value.

17. An ion trap comprising:

an RF multipole ion guide supplied with two radio frequency (RF) phases of an RF signal; and an exit electrode, wherein the two RF phases are brought out of balance.

18. The ion trap of claim 17, wherein an imbalance between the two RF phases is controllably varied to arrange a mass dependent axial ion sampling.

19. A mass spectrometer comprising an analyzer that comprises the ion trap of claim 17.

20. A multi-stage tandem mass spectrometer comprising the mass spectrometer of claim 15 as any of the analyzers.

21. An ion gaseous reactor comprising the ion trap of claim 17.

22. A reactor for particles of opposite polarity comprising the ion trap of claim 17.

23. A fragmentation cell comprising the ion trap of claim 17.

24. An array of ion traps to arrange mass selective storage and ion manipulation comprising the ion trap of claim 15.

25. A time-of-flight mass spectrometer with an orthogonal ion accelerator comprising an ion trap of claim 17 for mass dependent ion ejection, such that ions of different m/z arrive to the orthogonal accelerator at essentially the same time and same energy.

26. An ion source for generating a packet of ions within a selected mass range comprising the ion trap of claim 17.

27. A multi-reflecting time-of-flight mass spectrometer with an ion source of claim 26.

28. A cut-off mass filter comprising the ion trap of claim 17.

29. A tandem mass spectrometer for parallel MS-MS analysis comprising the ion trap of claim 17.

* * * * *